(12) United States Patent
Takahashi et al.

(10) Patent No.: US 6,283,074 B1  
(45) Date of Patent: Sep. 4, 2001

(54) VALVE TIMING CONTROL SYSTEM FOR INTERNAL COMBUSTION ENGINE

(75) Inventors: Tatsuhiko Takahashi, Hyogo; Satoshi Wachi, Tokyo; Atsuko Hashimoto, Tokyo; Hirofumi Ohuchi, Tokyo, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/432,794

(22) Filed: Nov. 3, 1999

(30) Foreign Application Priority Data

May 20, 1999 (JP) ................................. 11-140300

(51) Int. Cl.$^7$ ............................. F02D 13/02; F01L 1/34
(52) U.S. Cl. ................................ 123/90.15; 123/90.17
(58) Field of Search .............................. 123/90.15, 90.16, 123/90.17, 90.18, 90.31

(56) References Cited

U.S. PATENT DOCUMENTS

| | | | |
|---|---|---|---|
| 5,333,577 | 8/1994 | Shinojima | 123/90.15 |
| 5,611,304 | 3/1997 | Shinojima | 123/90.15 |
| 5,623,896 | 4/1997 | Kato et al. | 123/90.15 |
| 5,626,109 | * 5/1997 | Yasumura et al. | 123/90.15 |
| 5,694,912 | * 12/1997 | Gotou et al. | 123/674 |
| 5,937,806 | 8/1999 | Lyko et al. | 123/90.15 |
| 5,937,808 | 8/1999 | Kako et al. | 123/90.15 |
| 6,024,061 | 2/2000 | Adachi et al. | 123/90.17 |
| 6,109,225 | * 8/2000 | Ogita et al. | 123/90.15 |

FOREIGN PATENT DOCUMENTS 4-194331  7/1992  (JP).

* cited by examiner

*Primary Examiner*—Wellun Lo  
(74) *Attorney, Agent, or Firm*—Sughrue, Mion, Zinn, Macpeak & Seas, PLLC

(57) ABSTRACT

A valve timing control system for an internal combustion engine, comprising a required advance amount calculating section for calculating a required advance amount on the basis of operating condition of the engine, a valve timing control section for calculating a valve timing control variable on the basis of an obtained advance amount and the required advance amount calculated by the required advance amount calculating section, and a time period measuring section for measuring an elapsed time after the start of the engine. The required advance amount calculating section makes a calculation so that the required advance amount assumes a value smaller than that in an normal state until the time period measuring section measures a predetermined period of time. Hence, exhaust gas clarification immediately after the engine start, fuel consumption and drivability can be improved.

17 Claims, 13 Drawing Sheets

VALVE TIMING CONTROL SYSTEM FOR INTERNAL COMBUSTION ENGINE

BACKGROUND OF THE INVENTION

1. Field of the Invention

The present invention relates to a valve timing control system for an internal combustion engine, which is for controlling the valve timing of the internal combustion engine.

2. Description of the Related Art

FIG. 12 is a conceptual illustration of a configuration of an internal combustion engine including a valve timing mechanism, disclosed in Japanese Patent Application Laid-open No. 6-299876.

As FIG. 12 shows, an internal combustion engine 1, including a conventional valve timing control system, is equipped with an air cleaner 2, an air flow sensor 3, a throttle valve 4, a throttle sensor 5, an intake pipe 6, an injector 7, an ignition plug 8, an exhaust pipe 9, an $O_2$ sensor 10, a catalytic converter 11, a sensor plate 12, a crank angle sensor 13, a sensor plate 14, a cam angle sensor 15, an oil control valve 16, an ECU 17 and an ignition coil 18.

Moreover, as shown in FIG. 13, a housing 21, a rotor 22, a retarding chamber 23, and an advancing chamber 24 constitute a VVT (Variable Valve Timing) actuator 20.

The air cleaner 2 is installed at an opening of the intake pipe 6 to clean the air the internal combustion engine 1 intakes. The air flow sensor 3 is installed on the downstream side of the air cleaner 2 to sense the air intake amount into the internal combustion engine 1. The throttle valve 4 is opened and closed in connection with the accelerator pedal to adjust the air intake amount. The throttle sensor 5 detects the opening degree of the throttle valve 4.

In such an internal combustion engine, when the driver steps on the accelerator pedal, the throttle valve 4 opens/closes, so that air is mixed with a fuel injected from the injector 7 and this air-fuel mixture is introduced into cylinders. The air-fuel mixture is then ignited by the ignition plug 8 to push the pistons downward by the combustion thereof, thereby causing the crank shaft to rotate. The rotation of the crank shaft is derived as the output of the internal combustion engine.

With this operation of the internal combustion engine, the $O_2$ sensor 10 detects the residual oxygen amount in the exhaust gas. The catalytic converter 11 simultaneously removes THC, CO and NOx which are harmful gases.

FIGS. 14 and 13 are enlarged illustrations of an essential portion of the VVT actuator.

In FIG. 13, the VVT (Variable Valve Timing) actuator 20 is situated on the intake side, and is composed of the housing 21, the rotor 22, the retarding chamber 23 and the advancing chamber 24.

The rotor 22 is fixedly fitted on a cam shaft (not shown) to keep a constant positional relationship (for example, the positional relationship shown in FIG. 13) with respect to the housing 21.

A timing belt, timing chain or the like (not shown) is set on the housing 21. This timing belt or the like is also placed on a crank shaft (not shown).

With this structure, the rotation of the crank shaft causes the rotation of the cam shaft through the timing belt or the like.

Furthermore, the oil control valve 16 controls the oil pressure to be applied to the VVT actuator 20 fitted to the cam shaft.

Thus, in order to vary the valve timing in the internal combustion engine, the ECU 17 controls the VVT actuator 20 through the oil control valve 16 to adjust the amount of the lubricating oil to be supplied to the retarding chamber 23 and the advancing chamber 24.

The ECU 17 shifts the relative position of the rotor 22 with respect to the housing 21, for example, from the position shown in FIG. 13 to the position shown in FIG. 14, thereby changing the valve timing.

FIG. 15 is a graph showing the characteristics of the relationship between valve timing and valve overlap. In this case, the term "valve overlap" signifies the overlap between the time period during which the intake valve is in the open condition and the time period during which the exhaust valve is in the open condition.

For instance, in order to retard the valve timing of the intake valve, the oil control valve 16 supplies the oil to the retarding chamber 23. At this time, the rotor 22 is rotated counterclockwise with respect to the housing 21, and the valve timing of the intake valve is retarded (in the direction indicated by arrow A in FIG. 15), so that the valve overlap decreases.

On the other hand, if the valve timing of the intake valve is advanced (in the direction indicated by the arrow B in FIG. 15), the valve overlap increases.

Furthermore, in the case of retarding the valve timing of the intake valve to a maximum, the housing 21 is brought into contact with the rotor 22 and is fixed at the position (see FIG. 14) where it stops mechanically, this being the position where the valve overlap assumes the minimum value.

In the following description, the advance amount in the case where the valve timing of the intake valve assumes this position will be referred to as a maximum retardation value, and in this case the valve timing of the intake valve is expressed as being at the maximum retardation position.

In the valve timing control for the internal combustion engine, the substantial advance amount (which will be referred to hereinafter as a VVT control variable) by the VVT mechanism is determined with the aforesaid maximum retardation value being employed as a reference. Moreover, this valve timing control is implemented by the ECU 17. The optimal valve timing required for the internal combustion engine varies according to the operating conditions. Therefore, the ECU 17 always controls the valve timing according to the operational conditions.

For instance, a ROM of the ECU 17 retains a two-dimensional map for determining a required advance amount on the basis of the engine speed detected by the crank angle sensor 13 and the charging efficiency of the engine.

Thus, the ECU 17 controls the valve timing so that the VVT controlled amount (variable) coincides with the required advance amount obtained from the two-dimensional map on the basis of the engine speed and the intake amount.

As mentioned above, the required advance amount is stored in the form of a deviation of the advance amount from the maximum retardation value employed as a reference, and signifies a required VVT control variable. Accordingly, if the required advance amount is zero, the ECU 17 carries out control so that the VVT control variable assumes zero, with the valve timing being set to the maximum retardation side.

Next, a description will be made hereinbelow of a valve timing detecting device.

The sensor plate 12 and the sensor plate 14 are axially fixed on the crank shaft and the cam shaft, respectively. Projections are formed on outer circumferences of the sensor plates 12, 14.

Furthermore, in the vicinity of the sensor plates 12, 14, the crank angle sensor 13 and the cam angle sensor 15 are located facing the outer circumferences thereof, respectively. The crank angle sensor 13 and the cam angle sensor 15 detect as variations of magnetic fields, the variations in the distance between the crank angle sensor 13 and the sensor plate 12 and the variations in the distance between the cam angle sensor 15 and the sensor plate 14, occurring with rotation of the sensor plates 12, 14 respectively.

Thus, with the rotation of the crank shaft and the cam shaft, the sensor plates 12, 14 rotate, and the crank angle sensor 13 and the cam angle sensor 15 sense the projections on the outer circumferences thereof to thereby detect a crank angle and a cam angle, respectively.

FIG. 16 is a flow chart showing the contents of the processing in a conventional valve timing control system for an internal combustion engine.

First, the operational flow starts at a step 1601 to check, on the basis of coolant temperature (cooling water temperature) in the internal combustion engine 1, whether the warming-up of the internal combustion engine 1 has been completed or not. If a decision in this step shows the completion of the warming-up, the operational flow advances to a step 1602 to set the valve overlap at an normal value.

In this instance, the term "valve overlap" means the overlap between the time that the intake valve is in the open condition and the time that the exhaust valve is in the open condition.

On the other hand, if the decision in the step 1601 indicates no completion of the warming-up, the operational flow proceeds to a step 1603 to set the valve overlap to a shorter value than ordinarily.

In this way, in the conventional valve timing control system for an internal combustion engine, the valve overlap is set to be short or small until the completion of the warming-up, while being set at the normal value after the completion of the warming-up.

In the conventional valve timing control system for an internal combustion engine, the reason why the valve overlap is set at a small value when the warming-up of the internal combustion engine is not completed, that is, when the internal combustion engine is cold, is that the combustion condition becomes unstable in this state.

If the valve overlap increases in the unstable combustion condition, due to the effects of the internal EGR, the residual exhaust gas increases within the cylinder and the combustion condition becomes further unstable because of the drop of the combustion temperature, which can lead to the occurrence of misfire. For this reason, commonly, control is implemented to set the valve overlap at a low value when an internal combustion engine is cold.

However, in the aforesaid internal combustion engine, the combustion condition can be unstable even after the completion of the warming-up.

For instance, at the start of the internal combustion engine, the fuel injection amount is increased in order to improve the starting performance. This control is done even at the starting after the completion of the warming-up, and immediately after the start, the combustion may be unstable by the influence of the extra fuel supply at the start.

In addition, in such a case, if the valve overlap is controlled to a value at an ordinary time, due to the increase in the internal EGR, the combustion temperature drops to cause the combustion condition to be more unstable, which results in the deterioration of the clarification of the exhaust gas and in the impairment of fuel consumption.

SUMMARY OF THE INVENTION

Accordingly, the present invention has been developed with a view to eliminating the above-mentioned problems, and it is an object of this invention to provide a valve timing control system for an internal combustion engine which is capable of improving the exhaust gas clarification and the fuel consumption in a manner of setting the valve overlap at a value smaller than ordinarily if the combustion condition immediately after the starting is unstable.

For this purpose, in accordance with an aspect of this invention, there is provided a valve timing control system for an internal combustion engine comprising a variable valve timing section for advancing or retarding a cam angle with respect to a crank angle, an advance amount calculating section for calculating an advance amount forming a phase difference between the cam angle and the crank angle, a required advance amount calculating section for calculating a required advance amount on the basis of an operating condition of the internal combustion engine, a valve timing control section for calculating a valve timing control variable for driving the variable valve timing section on the basis of the advance amount calculated by the advance amount calculating section and the required advance amount calculated by the required advance amount calculating section and further for controlling the variable valve timing section on the basis of the calculated valve timing control variable, and a time period measuring section for measuring an elapsed time after start of the internal combustion engine, wherein the required advance amount calculating section makes a calculation so that the required advance amount assumes a value smaller than that in an normal state (at an ordinary time) until the time period measuring section measures a predetermined period of time. Thus, it is possible to provide a valve timing control system for an internal combustion engine which is capable of improving the exhaust gas clarification immediately after the engine start, the fuel consumption and the drivability.

Furthermore, in accordance with another aspect of this invention, there is provided a valve timing control system for an internal combustion engine comprising a variable valve timing section for advancing or retarding a cam angle with respect to a crank angle, an advance amount calculating section for calculating an advance amount forming a phase difference between the cam angle and the crank angle, a required advance amount calculating section for calculating a required advance amount on the basis of an operating condition of the internal combustion engine, a valve timing control section for calculating a valve timing control variable for driving the variable valve timing section on the basis of the advance amount calculated by the advance amount calculating section and the required advance amount calculated by the required advance amount calculating section and further for controlling the variable valve timing section on the basis of the calculated valve timing control variable, and a time period measuring section for measuring an elapsed time after start of the internal combustion engine, wherein the valve timing control is inhibited forcedly until the time period measuring section measures a predetermined period of time. Thus, with a simple arrangement, it is possible to forcedly and surely control the valve timing to the maximum retardation position when needed.

In addition, the valve timing control system further comprises a time period setting section for setting the predetermined period of time for which a valve overlap between operations of an intake valve and an exhaust valve is set at a small value after the start of the internal combustion engine. Accordingly, it is possible to provide a valve timing control system for an internal combustion engine which is capable of improving the exhaust gas clarification immediately after the engine start, the fuel consumption and the drivability.

Still additionally, the required advance amount calculating section calculates the required advance amount through the use of a second map in which a small required advance angle covers a wider region than a first map to be used for the calculation of the required advance amount in an normal state, until the time period measuring section measures the predetermined period of time. Accordingly, with a simple configuration, it is possible to certainly reduce the valve overlap of the internal combustion engine immediately after the start thereof, which provides a valve timing control system for an internal combustion engine, which is capable of improving the drivability.

In this case, the region in the second map where the required advance amount assumes a smaller value than that in the first map is set in connection with an operating area in which a combustion condition of the internal combustion engine becomes unstable. Similarly, with a simple configuration, it is possible to certainly reduce the valve overlap of the internal combustion engine immediately after the start thereof, which provides a valve timing control system for an internal combustion engine which is capable of improving the drivability.

Furthermore, the required advance amount calculating section sets an upper limit to the required advance amount to be calculated according to the first map for the calculation of the required advance amount in the normal state until the time period measuring section measures the predetermined period of time. Similarly, with a simple configuration, it is possible to certainly reduce the valve overlap of the internal combustion engine immediately after the start thereof, which provides a valve timing control system for an internal combustion engine which is capable of improving the drivability.

In this instance, the predetermined period of time is set on the basis of a period of time needed until the combustion condition becomes stable after the start of the internal combustion engine. Similarly, with a simple configuration, it is possible to certainly reduce the valve overlap of the internal combustion engine immediately after the start thereof, which provides a valve timing control a system for an internal combustion engine which is capable of improving the drivability.

Furthermore, the predetermined period of time is set on the basis of a temperature of the internal combustion engine at the start of the internal combustion engine. Similarly, with a simple configuration, it is possible to certainly reduce the valve overlap of the internal combustion engine immediately after the start thereof, which provides a valve timing control system for an internal combustion engine which is capable of improving the drivability.

In this case, the predetermined period of time is set to be longer as the engine temperature drops. Similarly, with a simple configuration, it is possible to certainly reduce the valve overlap of the internal combustion engine immediately after the start thereof, which provides a valve timing control system for an internal combustion engine which is capable of improving the drivability.

Moreover, the predetermined period of time is set on the basis of an intake temperature at the start of the internal combustion engine. Under various conditions, it is possible to certainly reduce the valve overlap of the internal combustion engine immediately after the start thereof, which provides a valve timing control system for an internal combustion engine which is capable of improving the drivability.

Similarly, the predetermined period of time is set to be longer as the intake temperature becomes lower. Under various conditions, it is possible to certainly reduce the valve overlap of the internal combustion engine immediately after the start thereof, which provides a valve timing control system for an internal combustion engine which is capable of improving the drivability.

Still further, the predetermined period of time is set on the basis of a temperature of the internal combustion engine and an intake temperature at the start of the internal combustion engine. Similarly, under various conditions, it is possible to certainly reduce the valve overlap of the internal combustion engine immediately after the start thereof, which provides a valve timing control system for an internal combustion engine which is capable of improving the drivability.

In this case, the predetermined period of time is set to be longer as the engine temperature becomes lower and the intake temperature becomes lower. Similarly, under various conditions, it is possible to certainly reduce the valve overlap of the internal combustion engine immediately after the start thereof, which provides a valve timing control system for an internal combustion engine which is capable of improving the drivability.

Additionally, the predetermined period of time is set on the basis of an operating condition after the start of the internal combustion engine. Similarly, under various conditions, it is possible to certainly reduce the valve overlap of the internal combustion engine immediately after the start thereof, which provides a valve timing control system for an internal combustion engine which is capable of improving the drivability.

Furthermore, in the case that the charging efficiency of the internal combustion engine or the engine speed increases while the valve overlap is controlled to be smaller (shorter) than that in an normal state, the decrementing rate is increased at the measurement of the predetermined period of time so that the valve overlap is increased early up to a value to be taken in the normal state. Thus, according to the operating conditions, it is possible to provide a valve timing control system for an internal combustion engine which is capable of improving the drivability.

Still further, in the case that the charging efficiency of the internal combustion engine or the engine speed increases while the valve overlap is controlled to be smaller than that in an normal state, the predetermined period of time is reset and the measurement by the time period measuring section is stopped, while the valve overlap is increased up to a value to be taken in the normal state. Thus, according to the operating conditions, it is possible to provide a valve timing control system for an internal combustion engine which is capable of improving the drivability.

Besides, when the valve overlap is increased up to the value to be taken in the normal state, the valve overlap is increased gradually. Thus, it is possible to provide a valve timing control system for an internal combustion engine which is capable of improving the drivability.

Moreover, the time period measuring section is a counter device which counts an elapsed time after the start of the internal combustion engine, while the required advance amount calculating section makes a calculation so that the required advance amount becomes smaller than that in the normal state until the counter device counts the predetermined period of time. Accordingly, it is possible to provide a valve timing control system for an internal combustion engine which is capable of improving the exhaust gas clarification immediately after the start, the fuel consumption and the drivability.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION (First Embodiment)

Figure 1:
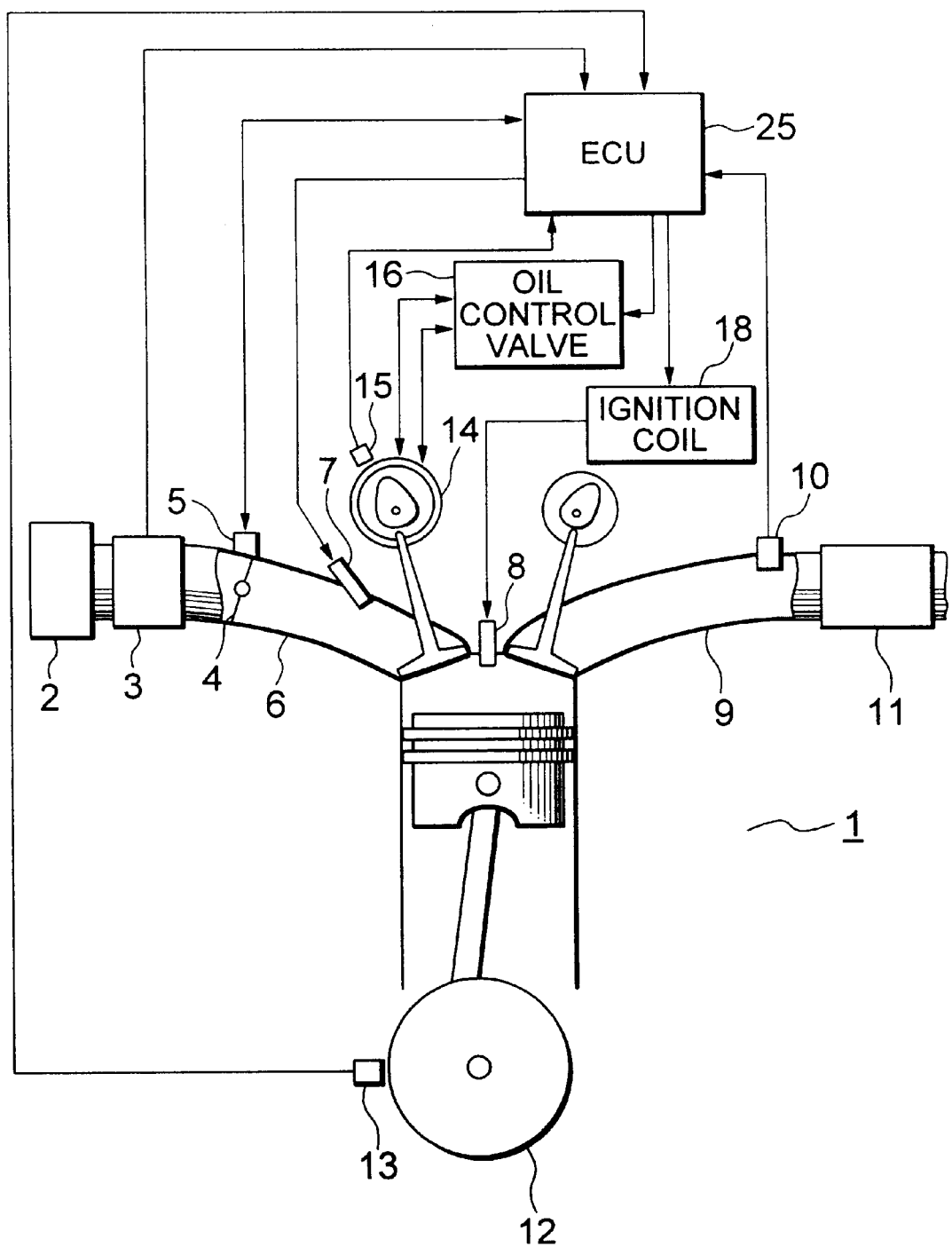
FIG. 1 is an illustration of a configuration of a valve timing control system for an internal combustion engine according to a first embodiment of this invention.

FIG. 1 is an illustration of a configuration of a valve timing control system for an internal combustion engine according to a first embodiment of the present invention.

In FIG. 1, parts corresponding to those of the conventional valve timing control system for an internal combustion engine are marked with the same numerals, and the description thereof will be omitted for brevity.

A crank angle sensor 13 serves as a crank angle detecting means and a cam angle sensor 15 acts as a cam angle detecting means. An ECU 25 functions as an advance amount calculating means, a learning means, a valve timing control variable calculating means and an operating condition determining means. A VVT actuator 20 functions as a variable valve timing means.

An air cleaner 2 is installed at an opening of an intake pipe 6 to clean the air an internal combustion engine 1 intakes. An air flow sensor 3 is installed on the downstream side of the air cleaner 2 to sense the intake amount into the internal combustion engine 1. A throttle valve 4 is opened and closed in connection with the accelerator pedal to adjust the air intake amount. A throttle sensor 5 detects the opening degree of the throttle valve 4.

In such an internal combustion engine, when the driver steps on the accelerator pedal, the throttle valve 4 opens/closes, and air is mixed with a fuel injected from the injector 7 and this air-fuel mixture is introduced into cylinders. The fuel-air mixture is then ignited by an ignition plug to push the pistons downwardly by the combustion thereof, thereby causing a crank shaft to rotate. The rotation of the crank shaft is derived as the output of the internal combustion engine.

With this operation of the internal combustion engine, an $O_2$ sensor 10 detects the residual oxygen amount in the exhaust gas. A catalytic converter 11 simultaneously removes THC, CO and NOx which are harmful gases contained in the exhaust gas.

A required advance amount written in a two-dimensional map is set to effectively develop the performance of the internal combustion engine when the warm-up is completed and the combustion condition is stable.

Accordingly, if the valve timing is controlled through the use of the aforesaid two-dimensional map while the internal combustion engine is cold, this causes the deterioration of the performance of the internal combustion engine. Further, in the case that the combustion condition is unstable after the completion of the warming-up, if the valve timing control is implemented through the use of the aforesaid two-dimensional map, the performance of the internal combustion engine falls. Thus, the retardation control can instead improve the engine performance.

Figure 2:
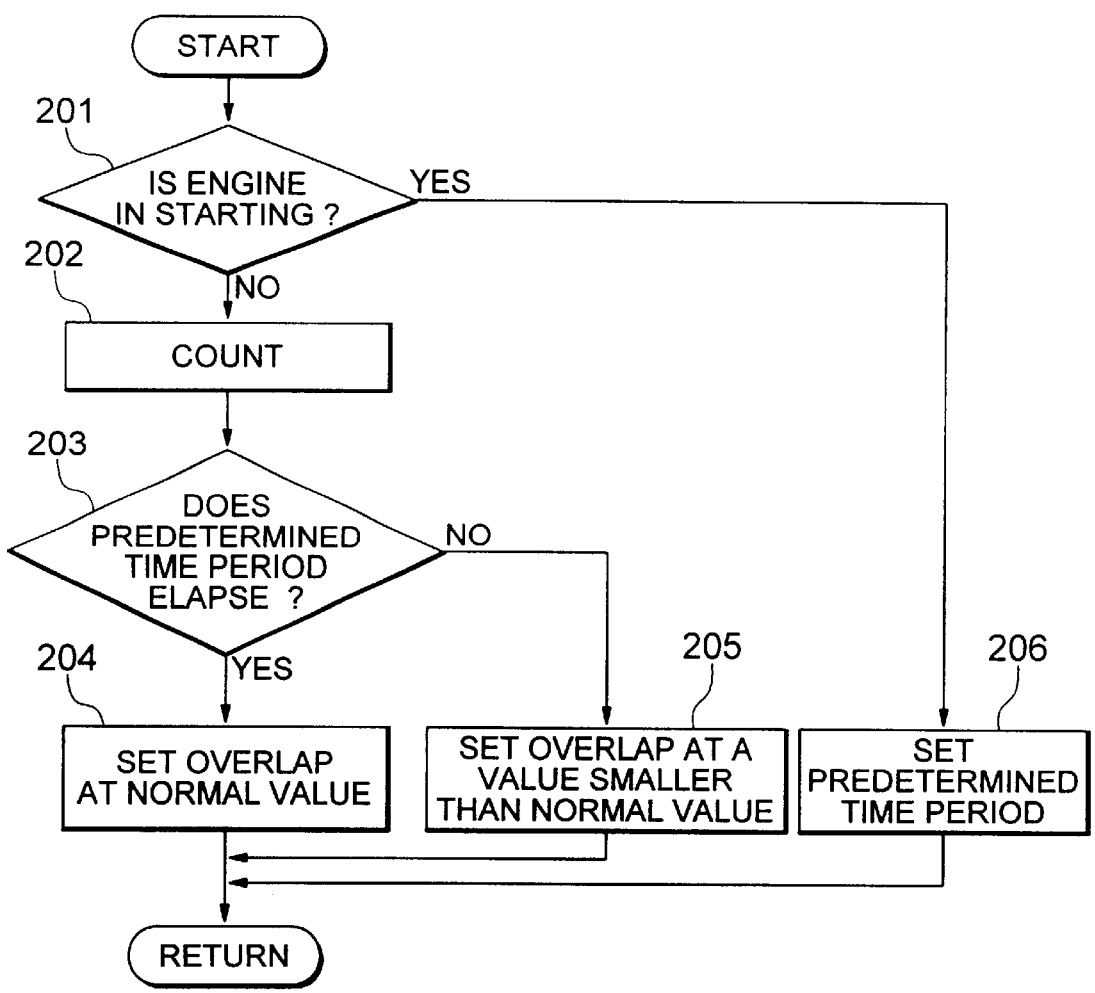
FIG. 2 is a flow chart showing the contents of the control processing in the internal combustion engine valve timing control system according to the first embodiment of this invention.

FIG. 2 is a flow chart showing the contents of the control processing in the internal combustion engine valve timing control system according to the first embodiment of this invention.

Figure 3:
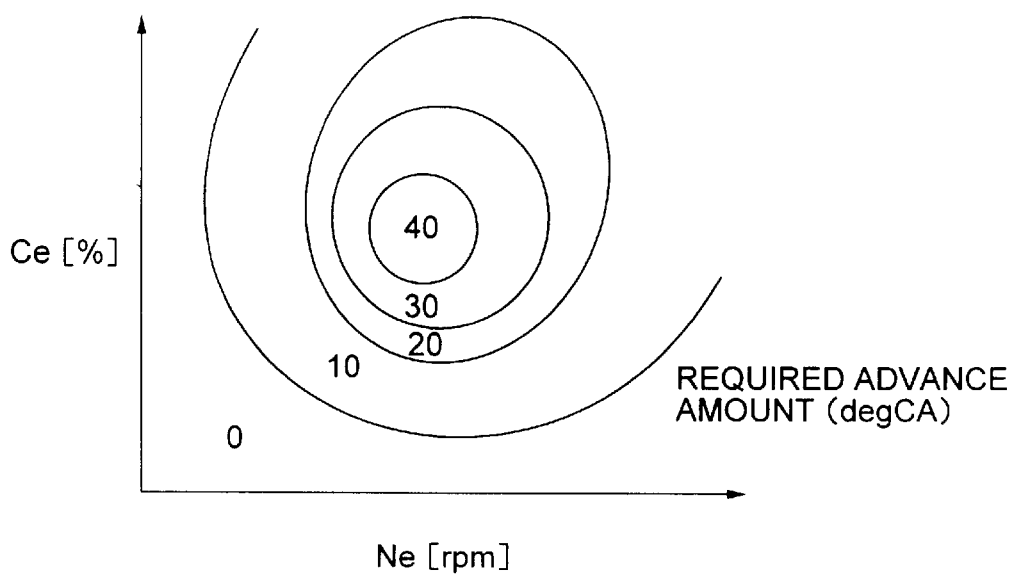
FIG. 3 is a map of a required advance amount based on engine speed and charging efficiency in the first embodiment of this invention.
Figure 4:
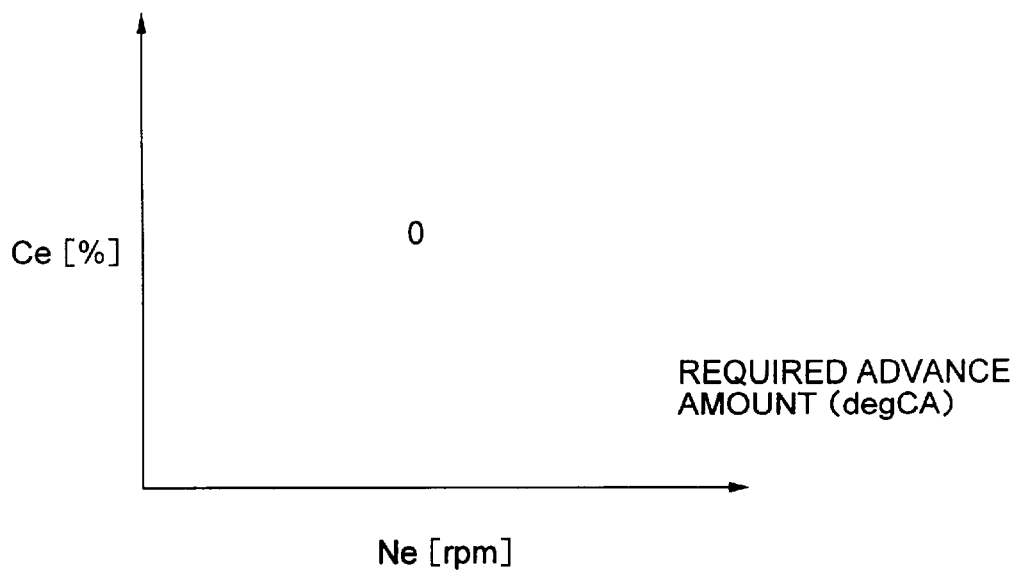
FIG. 4 is a map of a required advance amount based on engine speed and a charging efficiency in the first embodiment of this invention.

FIGS. 3 and 4 are illustrations of required advance amount maps made out on the basis of an engine speed and a charging efficiency in the first embodiment of this invention.

The ECU 25 takes charge of all the control processing. Particularly, the processing contents shown in FIG. 2 are repeatedly carried out by the ECU 25. In the following description, the VVT mechanism is provided on the intake valve side.

As FIG. 2 shows, a step 201 is implemented to check whether or not the internal combustion engine is in start. If being in start, the operational flow advances to a step 206 to set a predetermined period of time to set the valve overlap at a smaller value than that in the normal state. For example, the decision of the step 201 on whether or not the internal combustion engine is in starting may be made on the basis of whether or not the sel-motor is in operation, or whether or not the engine speed exceeds a predetermined speed.

In this case, the "normal state" signifies a state that the internal combustion engine is warmed sufficiently. Therefore, the value of the valve overlap in the normal state denotes a value of the valve overlap controlled variably in the normal state.

If the answer of the step 201 shows that the internal combustion engine is not in starting, the operational flow proceeds to a step 202 to count (measure) the elapsed time after the starting, concretely, to count a predetermined time, set in the step 206, down.

The operational flow goes to a step 203 to check whether or not the counter value reaches zero as the count-down result in the step 202, thereby determining whether or not the predetermined time (time period) has elapsed after the start.

If the answer of the step 203 shows the elapse of the predetermined time, the operational flow goes to a step 204 to advance the valve timing on the intake valve side in order to increase the valve overlap to a value to be taken in the normal state. For advancing the valve overlap in this way, for example, the calculation of a required advance amount is made according to a required advance amount map forming a first map made out as shown in FIG. 3 and the valve timing control is implemented so that the required advance amount coincides with the VVT control variable.

On the other hand, if the answer of the step 203 indicates no elapse of the predetermined time, the operational flow proceeds to a step 205 to retard the valve timing on the intake valve side so that the valve overlap assumes a value smaller (shorter) than that in the normal state. In such a case, for example, as shown in FIG. 4, the calculation of a required advance amount is made according to a required advance amount map being a second map in which the required advance amount is set at zero (degCA), without depending upon the engine speed and the charging efficiency, thus carrying out the valve timing control so that the required advance amount equals the VVT control variable. If the valve timing control is done through the use of the required advance amount map shown in FIG. 4, as compared with the case that the valve timing control is done according to the required advance amount map shown in FIG. 3, the valve overlap is reducible.

Incidentally, although the time to be set in the step 206 can be fixed at all times, in general the time that the combustion condition of the internal combustion engine becomes unstable varies in accordance with the temperature of the internal combustion engine at the start thereof. For this reason, as the internal combustion engine is colder at the start, the time to be set in the step 206 may be set to be longer.

Figure 5:
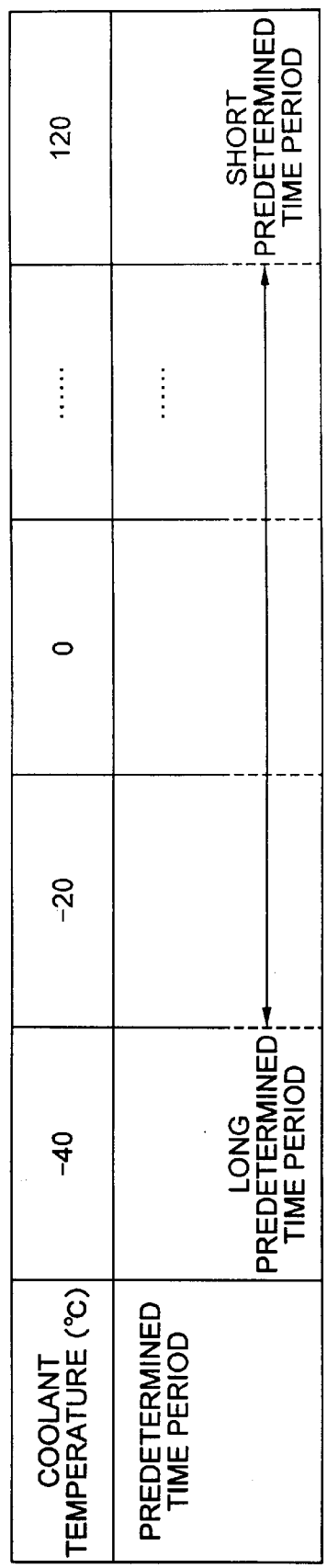
FIG. 5 is a map exemplifying the relationship between coolant temperature in an internal combustion engine and a predetermined period of time.

FIG. 5 is an illustration of a map exemplifying the relationship between coolant temperature in an internal combustion engine and a predetermined period of time.

For instance, as FIG. 5 shows, the coolant temperature is used as the engine temperature, and a predetermined time to be set in the step 206 in relation to coolant temperature detected by a coolant temperature sensor (not shown) is stored in a ROM of the ECU 25 in advance.

At the start of the internal combustion engine, using a coolant temperature at the start, the interpolation reference is made for a value shown in FIG. 5 to set a predetermined period of time for retarding the valve timing on the intake valve side so that the valve overlap becomes smaller as compared with that in the normal state. As shown in FIG. 5, the predetermined period of time is prolonged as the coolant temperature falls.

As described above, according to the first embodiment of this invention, in the case that combustion condition is unstable immediately after the start, irrespective of the completion of the warming-up of the internal combustion embodiment, the valve timing on the intake valve side is retarded so that the valve overlap becomes smaller than that in the normal state. Accordingly, it is possible to provide a valve timing control system for an internal combustion engine which is capable of improving the clarification of the exhaust gas immediately after the start, the fuel consumption and the drivability.

Incidentally, although in the above description the VVT mechanism is provided on the intake valve side, also to the case that the VVT mechanism is provided on the exhaust valve side or to the case that the VVT mechanism is installed on both the intake and exhaust sides, this invention is applicable.

In addition, although in the first embodiment the counter acting as the time period measuring means counts the predetermined period of time, this invention is not limited to this, but it is also appropriate that a predetermined number of times of ignition, a predetermined integrated value of the engine speed or the like is employed as the predetermined time and the control is accomplished before this predetermined time elapses after the start of the internal combustion engine.

(Second Embodiment)

Figure 6:
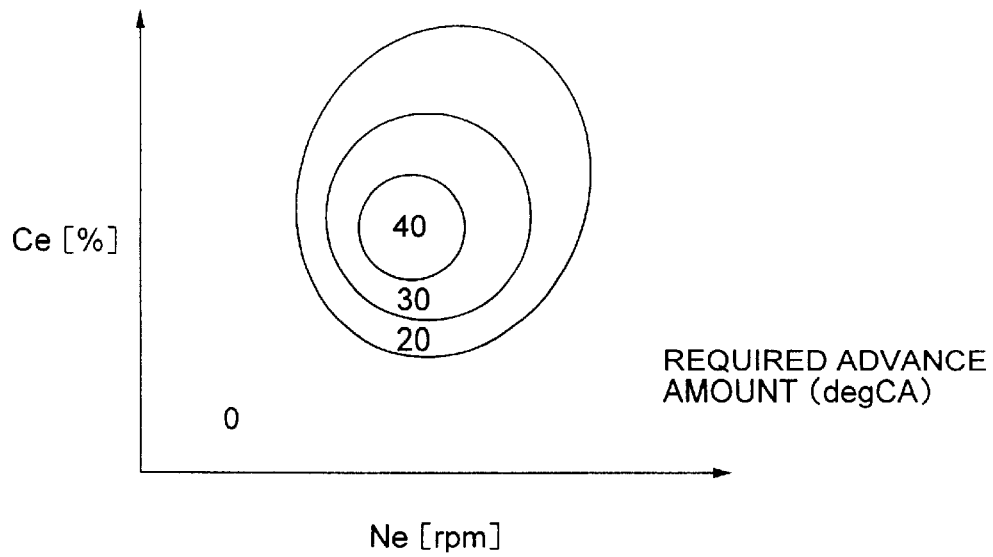
FIG. 6 is a map of a required advance amount based on engine speed and a charging efficiency in a second embodiment of this invention.
Figure 7:
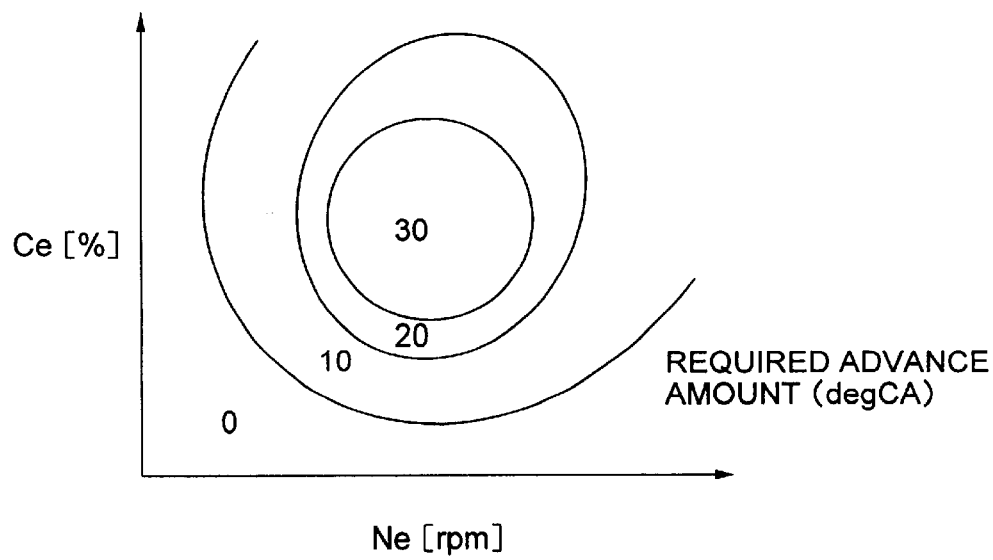
FIG. 7 is a map of a required advance amount based on engine speed and a charging efficiency in the second embodiment of this invention.

FIGS. 6 and 7 are illustrations of a required advance amount map made out on the basis of an engine speed and a charging efficiency in a second embodiment of this invention. These maps are used as a second map.

Depending upon the operating conditions of the internal combustion engine, even immediately after the start, there is a case that the combustion condition is stable and the operating condition becomes instead better when the valve overlap is set at a value to be taken in the normal state. In general, in an internal combustion engine, when the engine speed is low, when a load is small, when the valve overlap is increase, or in other cases, the combustion condition tends to be unstable. Other than such operating conditions, even immediately after the start, the combustion condition of the internal combustion engine becomes stable, and no problem occurs even if the valve overlap is set at a value to be taken in the normal state, instead the operating condition of the internal combustion engine can improve.

The contents of the processing in the internal combustion engine valve timing control system according to the second embodiment of this invention is basically similar to those in the first embodiment shown in FIG. 2. Besides, the ECU 25 implements all the control processing in the second embodiment.

As described above, in the processing contents in the first embodiment, a required advance amount is calculated according to the map shown in FIG. 3 in the normal state and, in the case of the required advance amount is set to a small value (step 205), the map in which the required advance amount is 0 (degCA) as shown in FIG. 4 is put to use.

On the other hand, in a second embodiment, the required advance amount is always calculated according to either of the maps shown in FIGS. 6 and 7.

In the maps shown in FIGS. 6 and 7, there is a region in which the required advance amount is reduced as compared with the FIG. 3 map. That is, for instance, in the FIG. 6 map, the region in FIG. 3 where the required advance amount is 10 (degCA) is removed therefrom, while, in the FIG. 7 map, the region in FIG. 3 where the required advance amount is 40 (degCA) disappears.

Furthermore, without being limited to the use of the map shown in FIGS. 6 or 7, even if an upper limit is imposed on the required advance amount while the map shown in FIG. 3 is referred to, this invention is applicable as well as the above-described cases.

Thus, in the internal combustion engine valve timing control system according to the second embodiment of this invention, in the step 205 the interpolation calculation is done on the basis of the map shown in FIGS. 6 or 7 for a required advance amount, so that the required advance amount becomes smaller as compared with the case of using the FIG. 3 map in the first embodiment, and becomes larger as compared with the case of using the FIG. 4 map in the first embodiment.

Accordingly, in the operating condition where the combustion condition is stable even if the overlap is set at a value to be taken in the normal state, since the valve overlap is not reduced than it needs, it is possible to provide a valve timing control system for an internal combustion engine which is capable of improve the exhaust gas clarification, the fuel consumption and the drivability.

(Third Embodiment)

Although in the second embodiment the time to be set in the step 206 is determined on the basis of coolant temperature, for example, even if the coolant temperature is the same, the combustion condition varies with the atmosphere temperature (intake temperature), and the time to be taken until the combustion condition becomes stable also varies.

A valve timing control system for an internal combustion engine according to a third embodiment of this invention is designed to calculate a required advance amount considering the intake temperature additionally.

Figure 8:
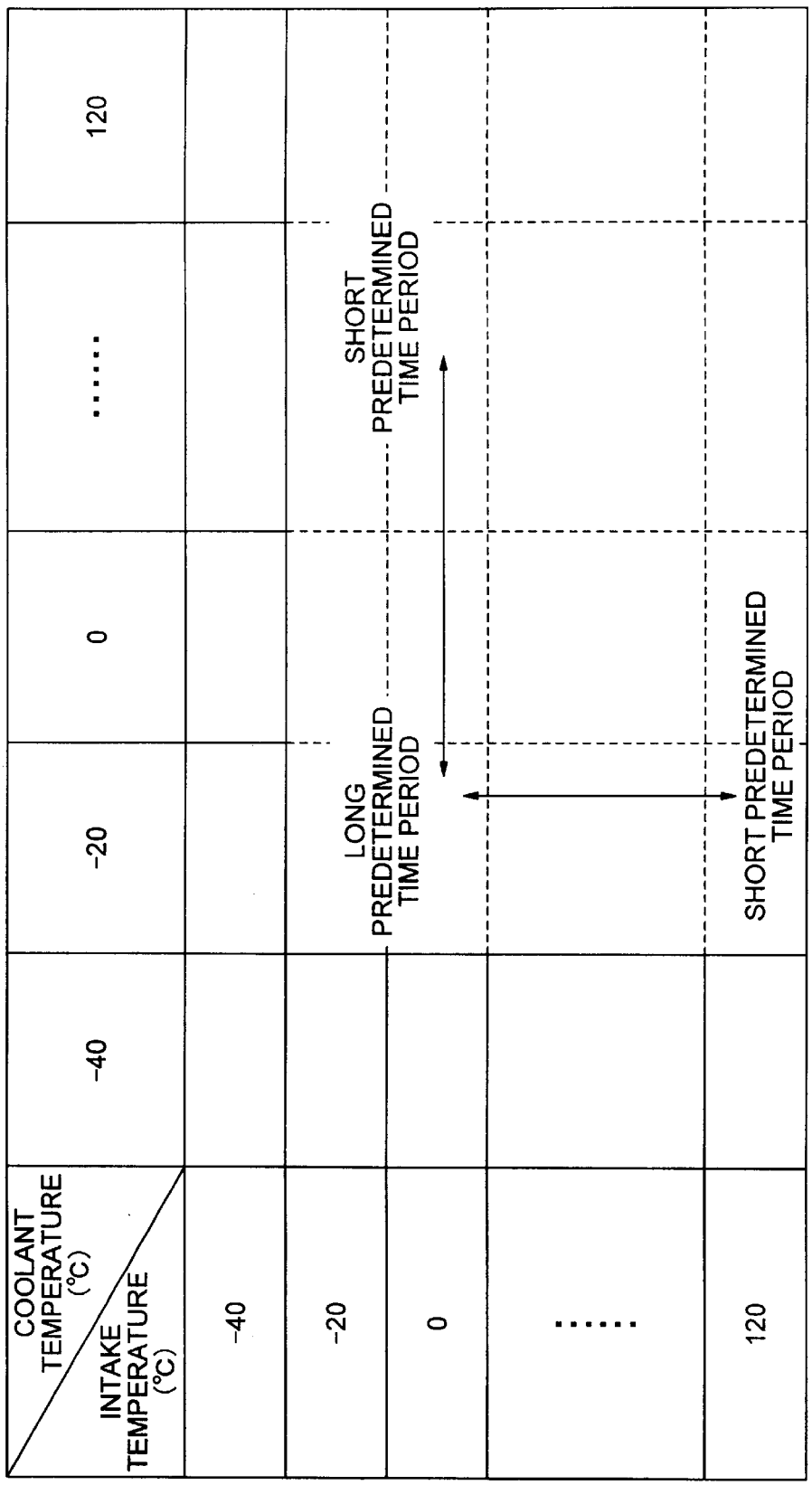
FIG. 8 is a map of a predetermined period of coolant temperature and an intake temperature in a third embodiment of this invention.

FIG. 8 is an illustration of a map for a predetermined period of time, made out on the basis of coolant temperature and an intake temperature.

The processing contents in an internal combustion engine valve timing control system according to the third embodiment of this invention are basically similar to those in the first embodiment shown in FIG. 2. Besides, the ECU 25 covers all the control processing in the third embodiment.

Although the time to be set in the step 206 is obtained through the use of the table representative of the correspondence between coolant temperature and a predetermined time period data as shown in FIG. 5, in the third embodiment a predetermined period of time is set in the step 206 using an intake temperature corresponding to an atmosphere temperature as a parameter.

The predetermined time period data in FIG. 8 is set to be longer as the coolant temperature becomes lower and further set to be longer as the intake temperature becomes lower.

While the method in which the required advance amount is calculated on the basis of coolant temperature and an intake temperature has been described above, it is also possible to calculate a required advance amount on the basis of the intake temperature only. In this case, the predetermined time period may be prolonged with the decrease in the intake temperature.

As described above, in the internal combustion engine valve timing control system according to the third embodiment of this invention, the time to be taken for reducing the valve overlap as compared with that in the normal state is set on the basis of the two parameters: coolant temperature and an intake temperature; therefore, it is possible to provide a valve timing control system for an internal combustion engine which is capable of improving the exhaust gas clarification, the fuel consumption and the drivability.

(Fourth Embodiment)

A valve timing control system for an internal combustion engine according to a fourth embodiment of this invention is basically similar in configuration to that of the control system according to the third embodiment, except that a function is provided to shorten a predetermined period of time set in the step 206. This function is provided in the ECU 25.

In the internal combustion engine valve timing control according to the third embodiment, until the time set in the step 206 elapses, regardless of the operating condition after that, the valve timing on the intake valve side is not advanced to increase the valve overlap up to a value to be taken in the normal state.

However, in the actual operating condition, the time that the combustion condition is unstable varies immediately after the start.

Figure 9:
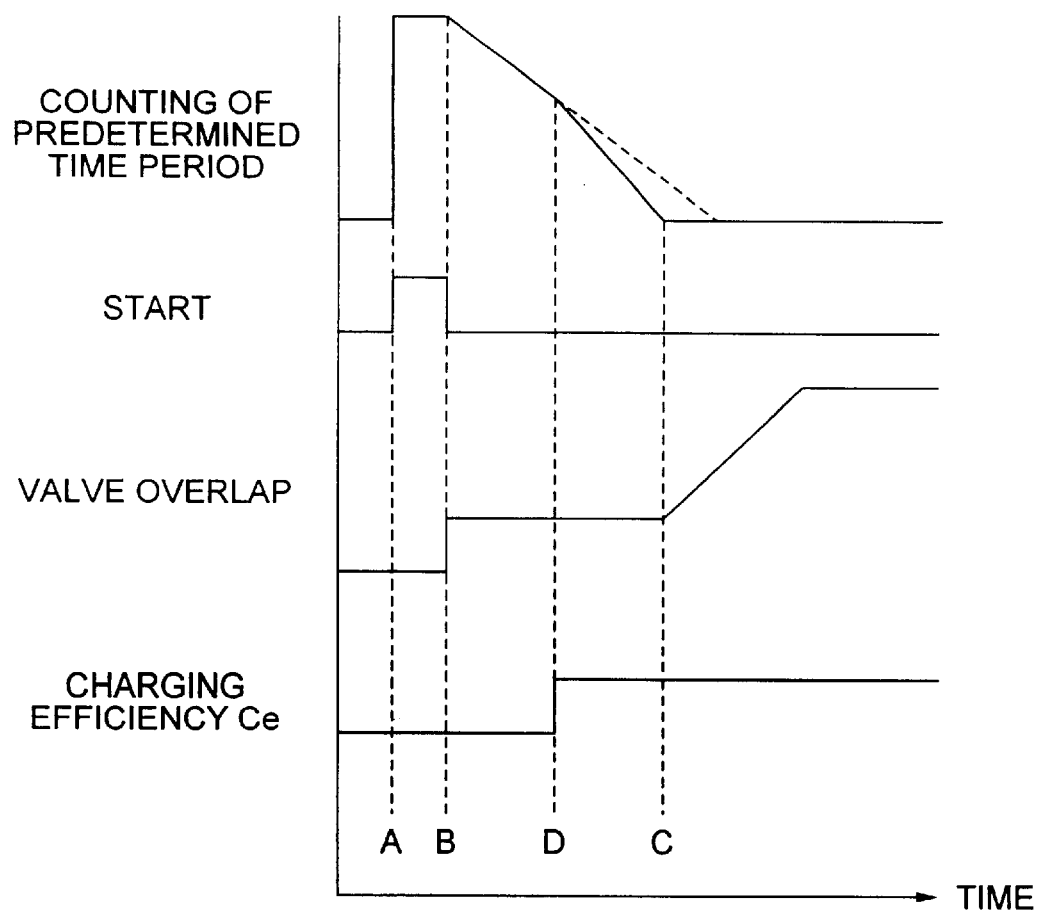
FIG. 9 is a timing chart schematically showing the contents of operation of a valve timing control system for an internal combustion engine according to a fourth embodiment of this invention.

FIG. 9 is a timing chart schematically showing the operational contents of the valve timing control system for an internal combustion engine according to the fourth embodiment of this invention.

The time period from a point A to a point B is a time period for the start of the internal combustion engine. During this starting time period, a predetermined time period for which the valve overlap is set at a small value is set, which corresponds to the processing time in the step 206.

The time period between the point B and a point C signifies a time period during which the overlap is reduced on the basis of the predetermined time period set in the step 206, corresponding to the processing time period in the step 205 in FIG. 2.

The point of time D denotes a point of time at which the operating condition of the internal combustion engine varies, for example, depicts a state in which the driver depresses the accelerator pedal to accelerate the motor vehicle. When the accelerator pedal is depressed, the intake amount increases and the charging efficiency Ce also rises. The rise in the charging efficiency signifies an increase in the load applied to the engine, and the combustion condition becomes more stable if the valve overlap is increased up to a value to be taken in the normal state.

In the internal combustion engine valve timing control system according to the fourth embodiment, when the charging efficiency increases as indicated at the time point D, the decrementing rate (decreasing rate) is increased in counting the predetermined time period, set in the step 206, down.

It is more appropriate that the decrementing rate is increased as the load of the internal combustion engine, that is, the charging efficiency, increases, thereby shortening the time period for which the valve overlap is controlled to assume a small value.

As FIG. 9 shows, for example, in the case that no charging efficiency rises, the predetermined time period is decremented as indicated by a broken line, while, if an increase in the charging efficiency occurs, the decrementing of the predetermined time period is done in a manner of promoting count-down per unit time as indicated by a solid line.

If the decrementing rate is increased in counting the predetermined time period down in this way, the predetermined time period set in the step 206 can be shortened, which improves the combustion condition of the internal combustion engine when the charging efficiency rises.

Thus, with the internal combustion engine valve timing control system according to the fourth embodiment of this invention, since a required advance amount is controllable on the basis of coolant temperature and an intake temperature, through monitoring the variation of the charging efficiency, the time period for which the valve overlap is set to a small value can be shortened to improve the combustion condition in the internal combustion engine immediately after the start, thus providing a valve timing control system for an internal combustion engine which is capable of improving the exhaust gas clarification, the fuel consumption and the drivability.

Although in the fourth embodiment of this invention the time period for which the valve overlap amount assumes a small valve is shortened by the increase in the decrementing rate due to the increase in the charging efficiency, it is also appropriate that the decrementing rate is increased by increasing the engine speed to shorten the time period of the reduction of the valve overlap.

(Fifth Embodiment)

Figure 10:
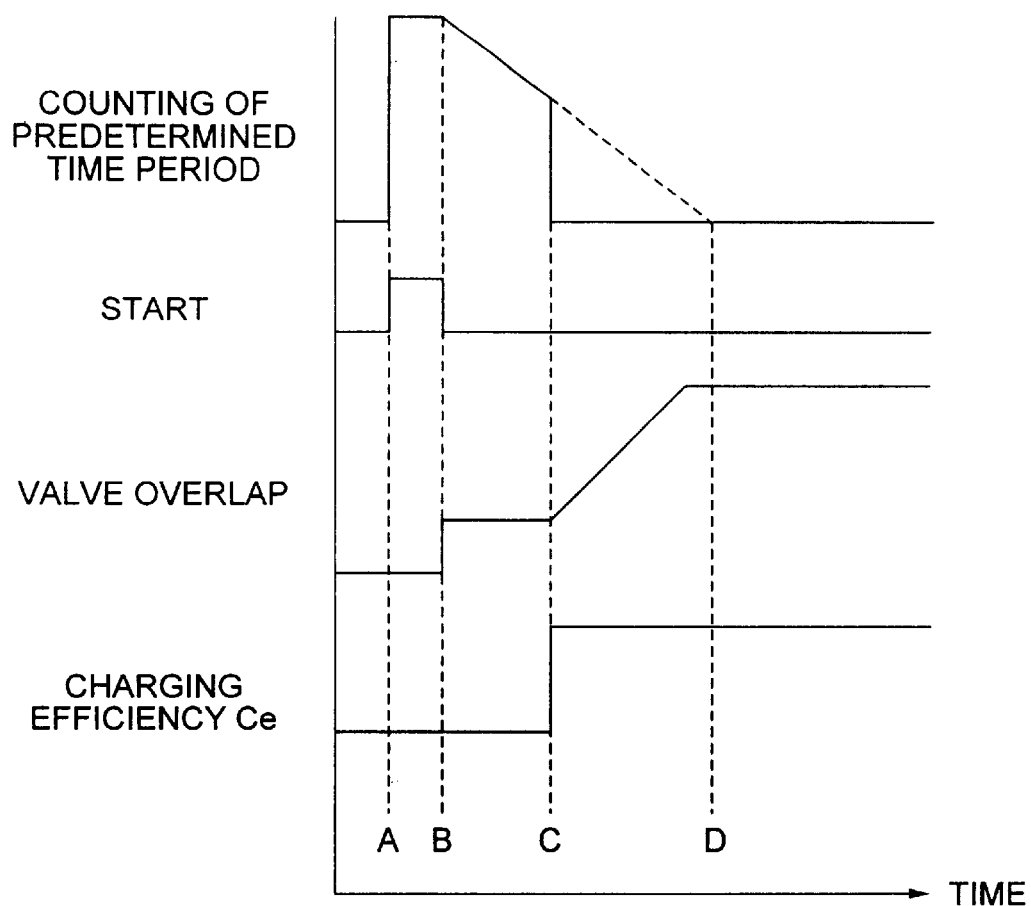
FIG. 10 is a timing chart schematically showing the contents of operation of a valve timing control system for an internal combustion engine according to a fifth embodiment of this invention.

FIG. 10 is a timing chart conceptually showing the processing contents in a valve timing control system for an internal combustion engine according to a fifth embodiment of this invention.

The internal combustion engine valve timing control system according to the fifth embodiment of this invention is basically similar in configuration to the control system according to the fourth embodiment, except that the time period for which the valve overlap is set at a value lower than taken in the normal state is adjusted in order to add to the combustion condition in the internal combustion engine immediately after the start. These processing are conducted in the ECU 25.

As FIG. 10 shows, when the charging efficiency Ce rises at the time C, the predetermined time period set in the step 206 is reset.

On the resetting of the predetermined time period, the valve overlap is increased to a value to be taken in the normal state. Accordingly, as compared with the control processing in the fourth embodiment, an ability to more quickly cope with the condition can be given, thus providing a valve timing control system for an internal combustion engine which is capable of improving the exhaust gas clarification, the fuel consumption and the drivability.

(Sixth Embodiment)

Figure 11:
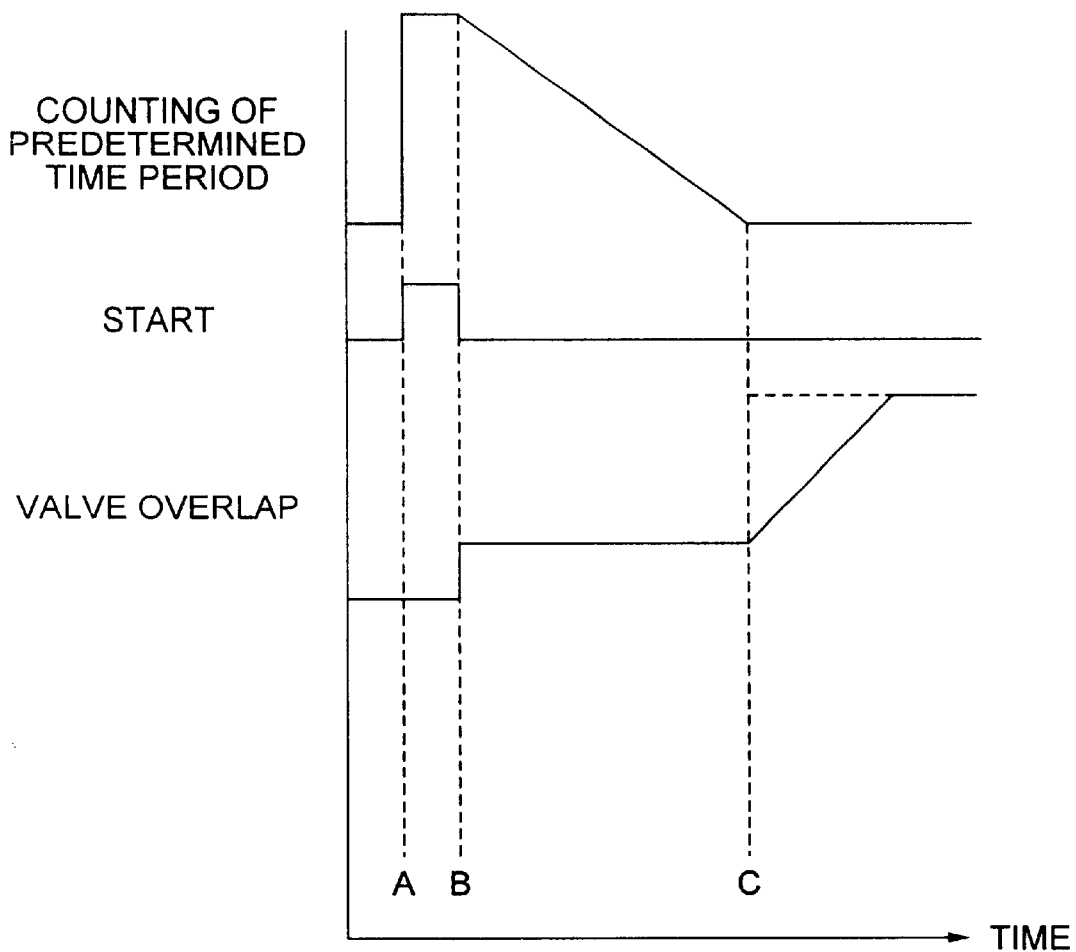
FIG. 11 is a timing chart schematically showing the contents of operation of a valve timing control system for an internal combustion engine according to a sixth embodiment of this invention.
Figure 12:
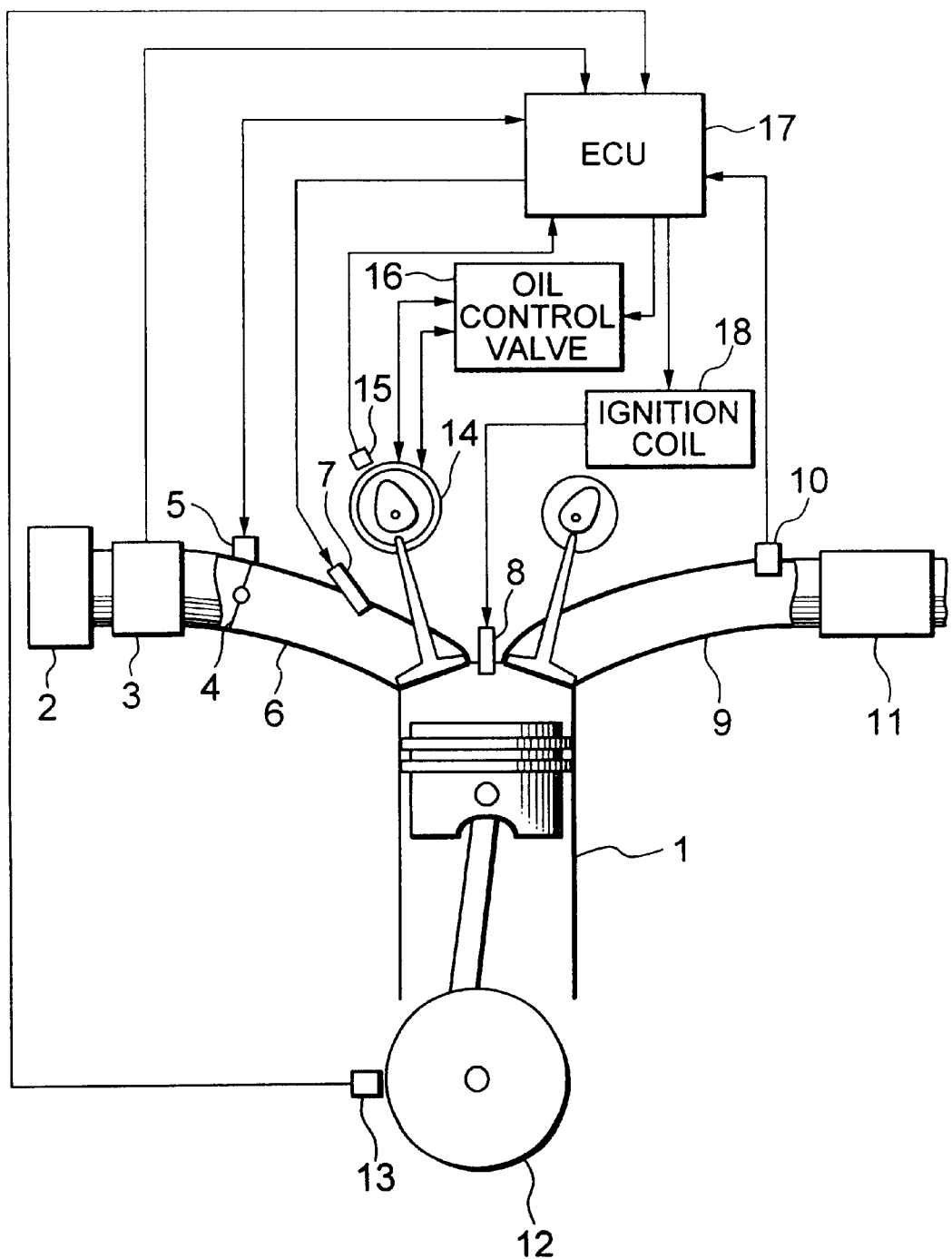
FIG. 12 is an conceptual illustration of a configuration of an internal combustion engine including a valve timing feature disclosed in Japanese Patent Application Laid-open No. 6-299876.
Figure 13:
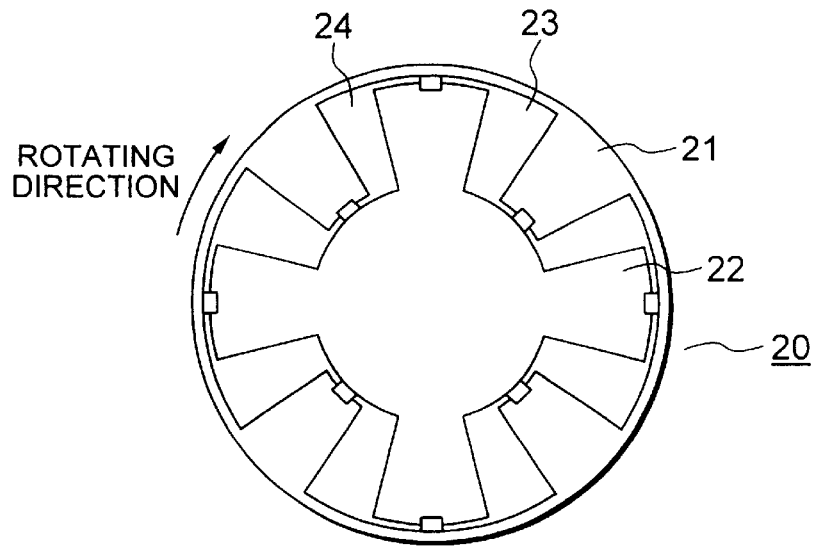
FIG. 13 is an enlarged illustration of an essential portion of a VVT actuator.

FIG. 11 is a timing chart schematically showing the processing contents in a valve timing control system for an internal combustion engine according to a sixth embodiment of this invention.

In the case of the valve timings in the internal combustion engine according to the first to fifth embodiments, because the valve overlap is increased instantly to a value to be taken in the normal state after the predetermined time period set in the step 206 is over, there is a possibility that the combustion condition of the internal combustion engine rapidly varies at that time to cause a shock.

Thus, the internal combustion engine valve timing control system according to the sixth embodiment of this invention has a function to conduct control processing for eliminating this shock. This processing is done in the ECU 25.

As FIG. 11 shows, when the counting of a predetermined time period comes to an end at-the time C, the valve overlap is increase gradually as indicated by an solid line. Incidentally, a broken line signifies the variation of the valve overlap in the case of no implementation of such control.

The manner of increasing the valve overlap gradually, which can be employed here, covers any way such as a linear variation, an installation of a primary filter, as long as it prevents the occurrence of the shock.

In the sixth embodiment of this invention, after the end of a predetermined time period, the valve overlap is increased gradually to return up to a value to be taken in the normal state, thus providing a valve timing control system for an internal combustion engine which is capable of suppressing the torque variation taking place due to a rapid increase in the valve timing to further improve the drivability.

Also in the fourth and fifth embodiments, at the completion of the retardation control for setting the valve overlap to a small value, the gradual variation of the advance amount produces a means effective in the reduction of the shock. It is also possible to conduct similar processing as shown in FIGS. 9 and 10.

Although the above description has been made of the change of the valve timing on the intake side, the above-described processing is also applicable to valve timing control on the exhaust side.

Furthermore, although this invention has been described above in the case that a phase varying manner is employed as the method of varying the valve timing, this invention is not limited to this, but can take any way.

(Seventh Embodiment)

In the first to sixth embodiments of this invention, the valve timing control variable is adjusted in the case of controlling the valve overlap amount to a smaller value. On the other hand, a valve timing control system for an internal combustion engine according to a seventh embodiment of this invention has a function to forcedly set the current, to be supplied to the oil control valve 16, at zero regardless of the required advance amount. The ECU 25 takes charge of this function.

If the current to be supplied to the oil control valve 16 is forcedly set at zero until the counter counts a predetermined time period after the start of the internal combustion engine, the valve timing can be controlled to a maximum retardation position.

In this case, the current to be supplied to the oil control valve 16 may be cut, or the supply current may be set at a value which does not enable the operation of the oil control valve 16, instead of being completely set at zero.

Figure 14:
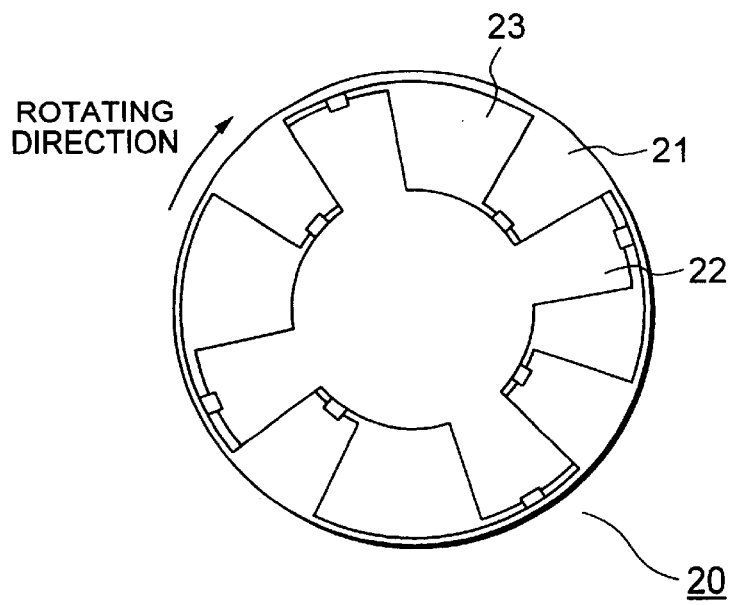
FIG. 14 is an enlarged illustration of the essential portion of the VVT actuator.
Figure 15:
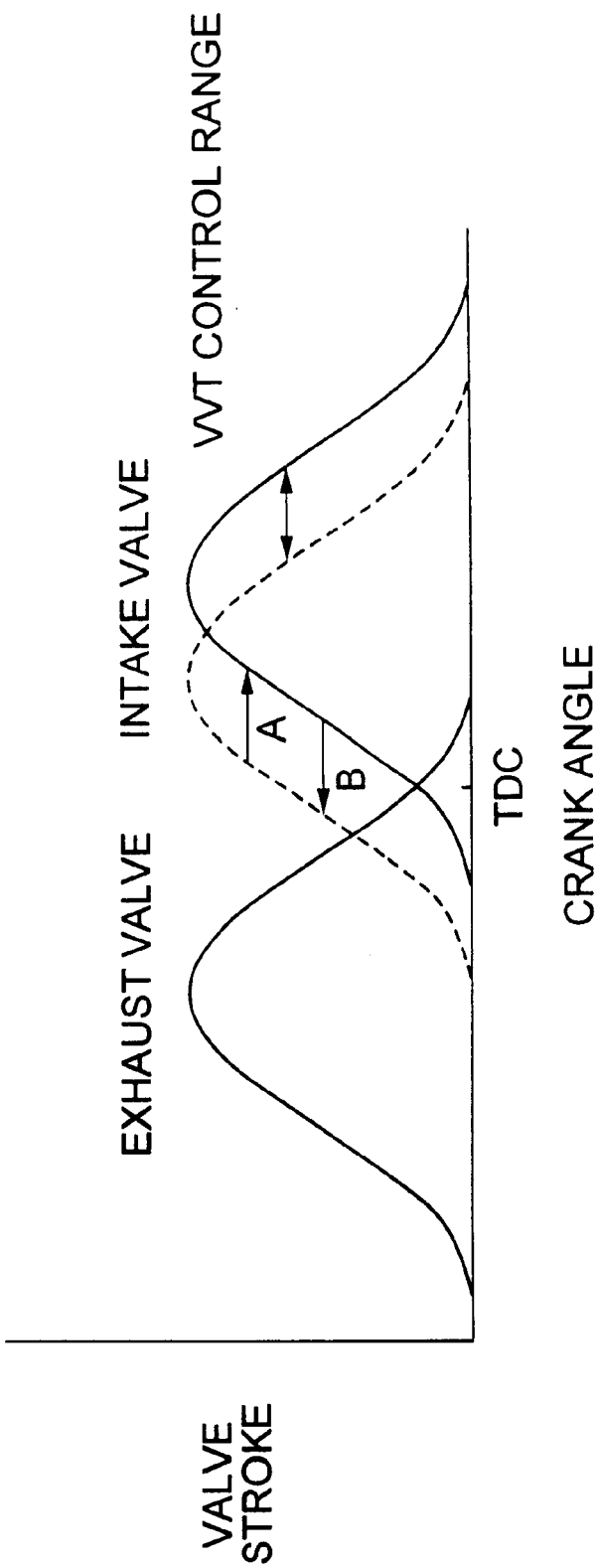
FIG. 15 is an illustration of the characteristic of the relationship between valve timing and valve overlap.
Figure 16:
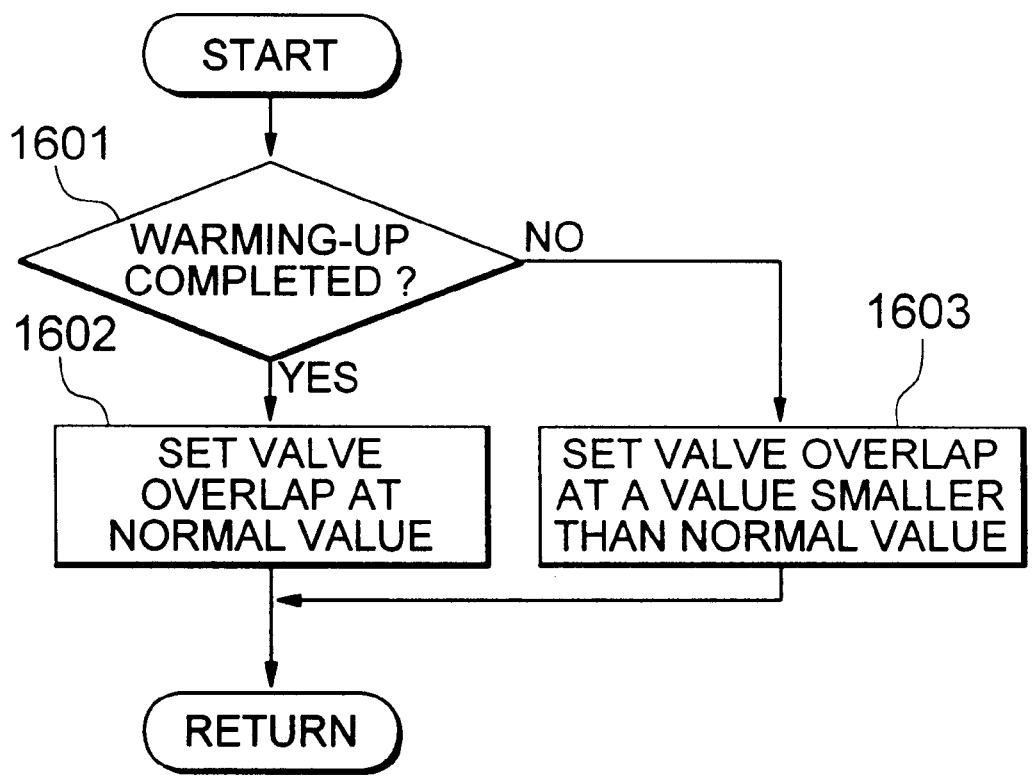
FIG. 16 is a flow chart showing the contents of processing in a conventional valve timing control system for an internal combustion engine.

With this control, after the start of the internal combustion engine, as shown in FIG. 14, the housing 21 fixed at a position where it is brought into contact with the rotor 22 to be stopped mechanically, which easily maintains a state where the lubricating oil remains in the retardation chamber 23 in the VVT actuator, with the result that it is possible to offer the same effects as those of the first to sixth embodiments of this invention.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A valve timing control system for an internal combustion engine which has a crank shaft and a cam shaft operatively connected with said crank shaft so as to rotate in synchronism therewith whereby intake and exhaust valves are driven to open and close by virtue of a valve operating mechanism mounted on said cam shaft in synchronism with the rotation of said crank shaft, said valve timing control system comprising:

variable valve timing means for advancing and retarding a cam angle with respect to a crank angle;

advance amount calculating means for calculating an advance amount being a phase difference between said cam angle and said crank angle;

required advance amount calculating means for calculating a required advance amount on the basis of an operating condition of said internal combustion engine;

valve timing control means for calculating a valve timing control variable, for driving said variable valve timing means, on the basis of said advance amount calculated by said advance amount calculating means and said required advance amount calculated by said required advance amount calculating means, and further for controlling said variable valve timing means on the basis of the calculated valve timing control variable; and time period measuring means for measuring an elapsed time after start of said internal combustion engine, wherein said required advance amount calculating means makes a calculation so that said required advance amount assumes a value smaller than that in a normal state until said time period measuring means measures a predetermined period of time.

2. A valve timing control system for an internal combustion engine according to claim 1, wherein said time period measuring means is counter means which counts an elapsed time after the start of said internal combustion engine, while said required advance amount calculating means makes a calculation so that said required advance amount becomes smaller than that in said normal state until said counter means counts said predetermined period of time.

3. A valve timing control system for an internal combustion engine according to claim 1, further comprising time period setting means for setting said predetermined period of time during which a valve overlap between operation of an intake valve and an exhaust valve is set at a small value after the start of said internal combustion engine.

4. A valve timing control system for an internal combustion engine according to claim 1, wherein said required advance amount calculating means calculates said required advance amount through the use of a second map in which a small required advance angle covers a wider region than a first map used for calculating said required advance amount in said normal state, until said time period measuring means measures said predetermined period of time.

5. A valve timing control system for an internal combustion engine according to claim 4, wherein said region in said second map where said required advance amount assumes a smaller value than that in said first map is set in connection with an operating area in which a combustion condition of said internal combustion engine becomes unstable.

6. A valve timing control system for an internal combustion engine according to claim 1, wherein said required advance amount calculating means sets an upper limit for said required advance amount to be calculated according to a first map for calculating said required advance amount in said normal state until said time period measuring means measures said predetermined period of time.

7. A valve timing control system for an internal combustion engine according to claim 1, wherein said predetermined period of time is set on the basis of a period of time that is required until a combustion condition of said internal combustion engine becomes stable after the start of said internal combustion engine.

8. A valve timing control system for an internal combustion engine according to claim 1, wherein said predetermined period of time is set on the basis of a temperature of said internal combustion engine upon starting said internal combustion engine.

9. A valve timing control system for an internal combustion engine according to claim 8, wherein said predetermined period of time is set to be longer as said engine temperature decreases.

10. A valve timing control system for an internal combustion engine according to claim 1, wherein said predetermined period of time is set on the basis of an intake temperature upon starting said internal combustion engine.

11. A valve timing control system for an internal combustion engine according to claim 10, wherein said predetermined period of time is set to be longer as said intake temperature becomes lower.

12. A valve timing control system for an internal combustion engine according to claim 1, wherein said predetermined period of time is set on the basis of a temperature of said internal combustion engine and an intake temperature upon starting said internal combustion engine.

13. A valve timing control system for an internal combustion engine according to claim 12, wherein said predetermined period of time is set to be longer as said engine temperature becomes lower and said intake temperature becomes lower.

14. A valve timing control system for an internal combustion engine according to claim 1, wherein said predetermined period of time is set on the basis of an operating condition after the start of said internal combustion engine.

15. A valve timing control system for an internal combustion engine according to claim 1, wherein, in the case that one of charging efficiency and an engine speed of said internal combustion engine increases while a valve overlap between a time during which an intake valve is in an open condition and a time during which an exhaust valve is in an open condition is controlled to be smaller than that in said normal state, a decrementing rate is increased upon measurement of said predetermined period of time so that said valve overlap is increased early to a value in said normal state.

16. A valve timing control system for an internal combustion engine according to claim 1, wherein, in the case that one of charging efficiency and an engine speed of said internal combustion engine increases while valve overlap between a time for which an intake valve is in an open condition and a time during which an exhaust valve is in an open condition is controlled to be smaller than that in said normal state, said predetermined period of time is reset and the measurement by said time period measuring means is stopped, while said valve overlap is increased up to a value to be taken in said normal state.

17. A valve timing control system for an internal combustion engine according to claim 15, wherein, when said valve overlap is increased to said value in said normal state, said valve overlap is increased gradually.

* * * * *